United States Patent [19]

Sebalos

[11] Patent Number: 4,685,164

[45] Date of Patent: Aug. 11, 1987

[54] AIR BRAKE ADJUSTMENT TOOL

[76] Inventor: Adam Sebalos, 140 Charles St., Jersey City, N.J. 07307

[21] Appl. No.: 819,360

[22] Filed: Jan. 16, 1986

[51] Int. Cl.$^4$ .............................................. B25F 1/00
[52] U.S. Cl. ........................................ 7/138; 7/100; 7/166; 81/177.85; 81/119; 81/463
[58] Field of Search .................. 7/100, 138, 166, 169, 7/170; 254/131, 17; 29/254, 267; 81/488, 463, 53.2, 121.1, 177.85, 119, 420, 424.5, 426.5

[56] References Cited

U.S. PATENT DOCUMENTS

| | | | |
|---|---|---|---|
| 1,689,585 | 10/1928 | Haschart | 7/100 X |
| 1,710,317 | 4/1929 | Lynch | 81/119 X |
| 1,761,156 | 6/1930 | Rosan | 81/463 X |
| 2,640,382 | 6/1953 | Grossman | 7/138 X |
| 2,681,791 | 6/1954 | Hahn | 254/131 |
| 2,718,374 | 9/1955 | Kellenbarger | 254/131 |
| 2,839,822 | 6/1958 | Dillingham et al. | 7/100 X |
| 2,860,408 | 11/1958 | Woyton | 7/166 X |
| 3,122,354 | 2/1964 | Rodeback | 254/131 |
| 4,334,376 | 6/1982 | Winslow | 254/131 X |
| 4,572,040 | 2/1986 | Metz | 81/463 |

Primary Examiner—Frederick R. Schmidt
Assistant Examiner—Debra S. Meislin

[57] ABSTRACT

This brake adjustment tool is for adjusting air brakes of automotive vehicles, and is a dual purpose tool that enables one man to properly adjust such brakes. Primarily, it consists of an elongated handle or main body having an opening for receiving a socket that is received on the adjustment screws of slack adjusters of air brakes, and a striker block is provided opposite the socket, for being struck by a hammer to free the usually seized locking collar on the adjustment screws. A channel grip member is also provided on the opposite end of the tool for receiving the slack adjuster to apply sufficient leverage to pull the slack adjuster to move the piston rod of the brake air cylinder, so as to enable the user to measure the stroke of the piston rod.

1 Claim, 6 Drawing Figures

FIG.5
FIG.3
FIG.6
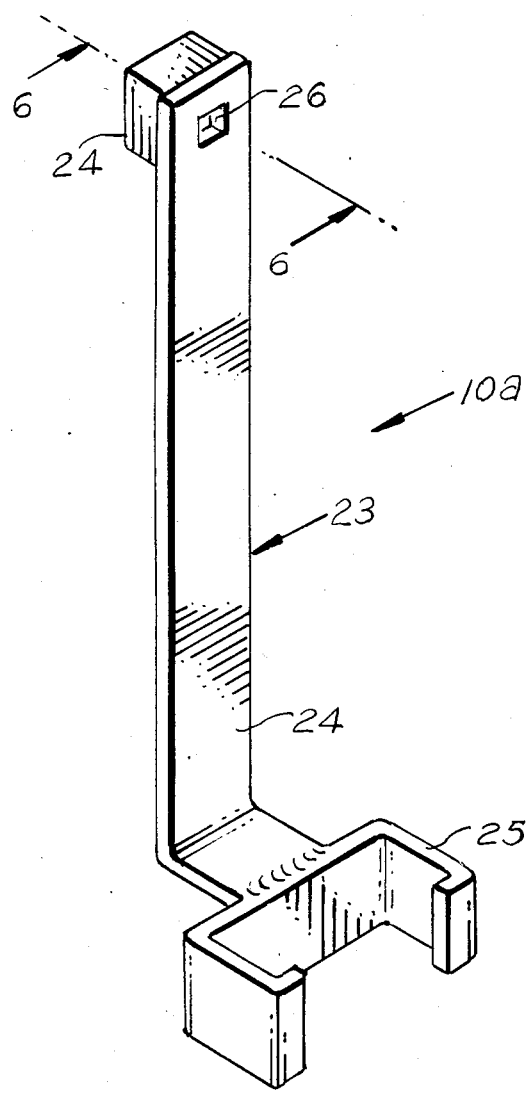
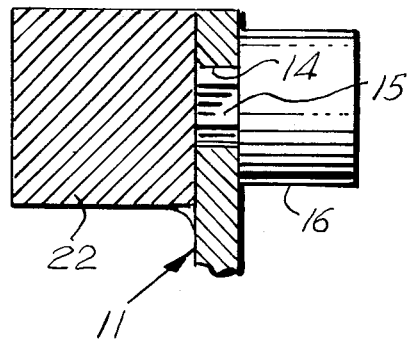
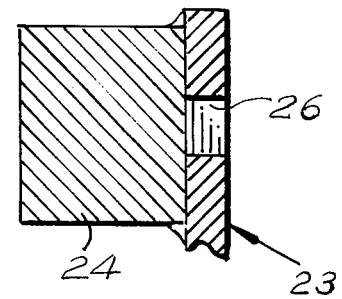

AIR BRAKE ADJUSTMENT TOOL

BACKGROUND OF THE INVENTION

1. Field of the Invention

This invention relates to tools for automotive vehicles, and more particularly, to an air brake adjustment tool.

2. Description of Prior Art

When checking and adjusting air brakes on heavy duty automotive vehicles, such as, buses or trailers of the "S"-cam type, it is necessary to check the air chamber piston travel stroke. This procedure must be effected prior to and after an adjustment. It also requires two men for obtaining a proper adjustment, because a single man cannot pull the slack adjuster with a sufficient amount of force by hand, to check the air chamber piston travel stroke, thus, a second person is needed to enter the cab of the vehicle and step on the brake pedal to execute a proper brake adjustment operation.

However, there are hit and miss methods that may be employed to perform a brake adjustment operation. The tool in accordance with the present invention, is a slack adjustment device, to give a single mechanic the means to grasp and pull a slack adjuster, enabling him to perform a proper brake adjustment, without employing a hit and miss method. References of record are the United States patents of Clair F. Hahn U.S. Pat. No. 2,681,791, Harry C. Grossman U.S. Pat. No. 2,640,382, and Jack M. Winslow U.S. Pat. No. 4,334,376.

The principal object of this invention is to provide an air brake adjustment tool, which will be employed to make an air brake adjustment a one man operation.

Another object of this invention is to provide an air brake adjustment tool, which will be employed on most manual and automatic slack adjusters that are used at present.

Another object of this invention is to provide an air brake adjustment tool, which will be of such structure, as to give a single mechanic a mechanical advantage through leverage means, to pull a slack adjuster of an air brake by hand with little effort, which will save a substantial amount of garage time and manpower.

A further object of this invention is to provide an air brake adjustment tool, which will be of such structure, that it will accomodate sockets of various sizes for adjustment screws of all sizes.

A still further object of this invention is to provide an air brake adjustment tool, which will employ a self-contained striker block, for being hit with a hammer to free a tight adjustment screw locking collar.

DESCRIPTION OF FIGURES

FIG. 3 is an enlarged cross-sectional view, taken along the line 3—3 of FIG. 2 and illustrating a socket therein;

FIG. 5 is a perspective view of a modified form of the invention, and

FIG. 6 is a cross-sectional view, taken along the line 6—6 of FIG. 5.

SUMMARY OF THE INVENTION

A brake adjustment tool for automotive vehicles, comprising a main body with placement means for a socket that will receive the adjustment screws of the slack adjusters of air brakes. The tool provide a mechanical advantage to a single mechanic, enabling him to grasp and pull a slack adjuster with a sufficient amount of force by hand, to check the air chamber piston travel stroke, which prevents the need of a second person in the cab of the vehicle to step on the brake pedal for obtaining proper brake adjustment, and the tool is provided with a striker block to be hit by a hammer to free a tight adjustment screw collar that is often seized due to road conditions.

DETAILED DESCRIPTION

Figure 1:
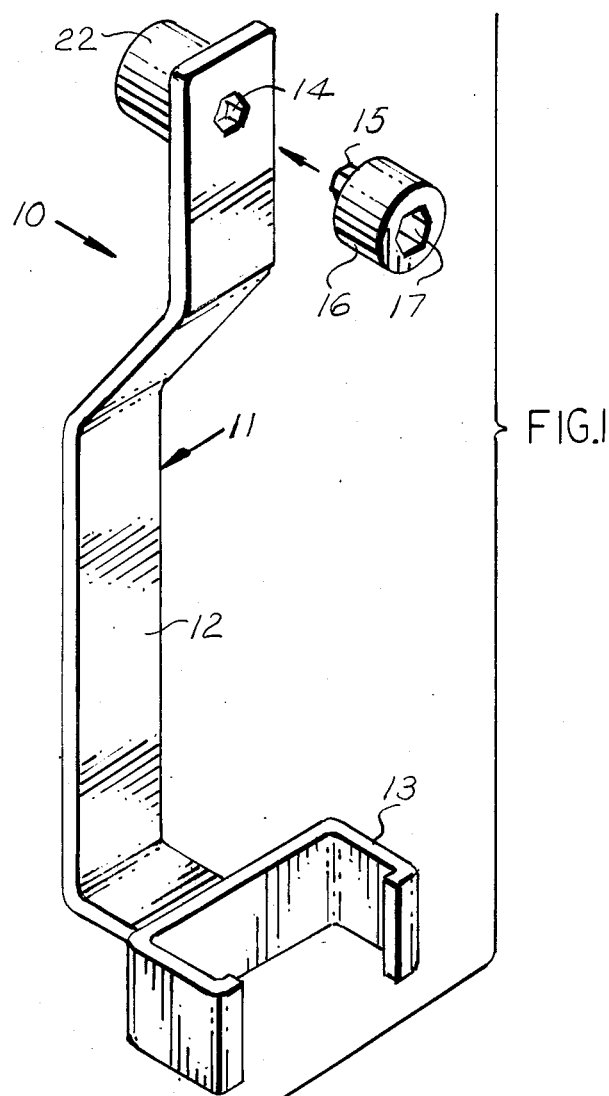
FIG. 1 is a perspective view of the present invention, showing a socket prior to be entered therein.
Figure 2:
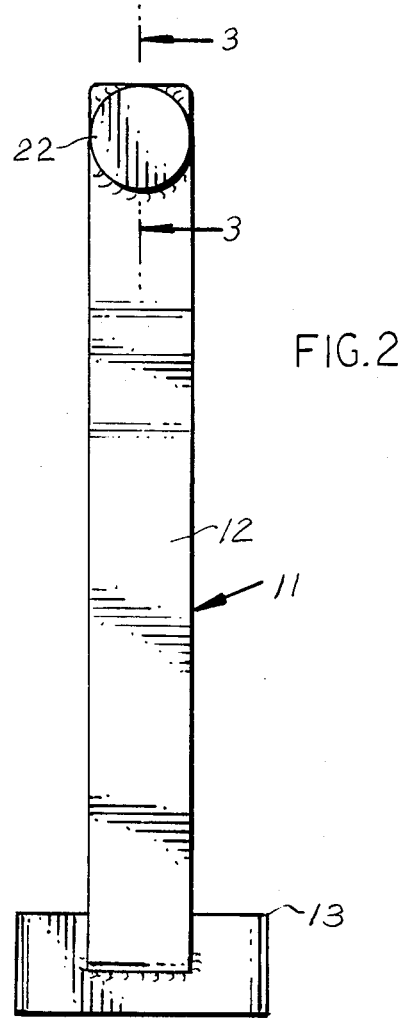
FIG. 2 is a rear view of FIG. 1, shown in elevation.
Figure 4:
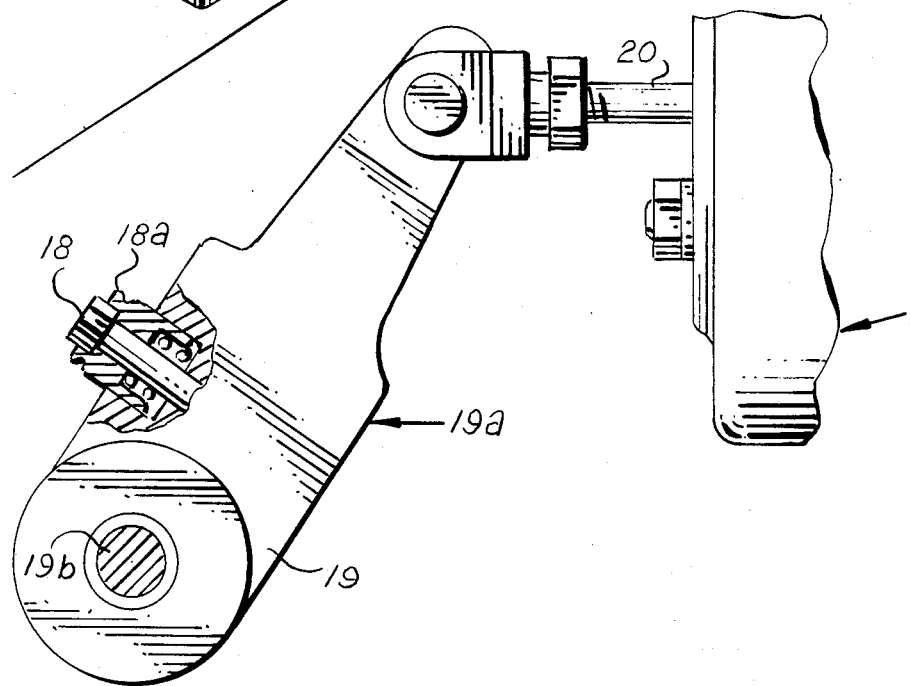
FIG. 4 is a side view of a slack adjuster and piston rod assembly, shown in elevation, the slack adjuster member, being shown partly in section and the air chamber fragmentary.

Accordingly, a tool 10 is shown to include a main body 11 of metal, which is rectangular in cross-sectional configuration in this instance, but is not limited to such. As illustrated in FIG. 1, main body 11 is provided with an off-set handle portion 12 formed therein, for center pull means, and a channel grip member 13 is fixedly secured at its rear closed side, to the bottom end of main body 11, by welding or other suitable means, not shown. A hexagonal opening 14 is provided through the top portion of main body 11, and removably received the hexagonal shank 15 of a socket 16 having a similar opening 17 for being received on adjustment screw 18 received in locking collar 18a in the body 19 of a slack adjuster 19a. As is known in the art, one end of the slack adjuster 19a is mounted to the brake actuating shaft 19b, and the opposite end is pivotally mounted to the piston rod 20 of air cylinder 21. The socket 16 may be of any size to fit various size screws 18, and on the opposite side of the upper portion of main body 11, a striker block 22 is provided and is welded or otherwise fixedly secured at one end, thereto. The striker block 22 is provided, so as to be struck by a hammer to free the locking collar 18a, if necessary.

In use, socket 16 is inserted into the opening 14 of tool 10, and is positioned over the set or adjustment screw 18 for rotation thereof, and while holding the handle portion 12, the mechanic hits the striking collar 22 with a hammer, because the locking collar 18a is often siezed. Striking the block 22 will force the socket 16 further down on the adjustment screw 18, which will force the locking collar 18a in to release the adjusting screw. The adjusting screw 18 is then rotated with tool 10 still in place, to adjust the brakes.

The piston rod 20 travel stroke of the air cylinder 21, must be checked before and after adjustment, and is accomplished by placing the channel grip member 13 on the body 19 of slack adjuster 19a. When the body 19 is in the confines of channel grip member 13, the mechanic pulls on the tool 10 to pivot the slack adjuster 19a, enabling the stroke of the piston rod 20 to be measured.

Referring now to FIGS. 5 and 6, a modified form of tool 10a for off-center pull, includes a body 23 with a straight handle portion 24, which is fixedly secured at its bottom end to a channel grip member 25, which is similar to the described member 13 of tool 10. A square opening 26 provided through the upper portion of main body 23, for receiving a square shanked socket, not shown, and a square striker block 24 is welded behind the opening 26, for being struck by a hammer.

In use, modified tool 10*a* functions in the same manner, as was described of tool 10, with the exception, that it is provided with a straight handle portion 24, for off-center pull means.

What is claimed is:

1. An air brake adjustment tool, comprising, a main body lying in a plane and forming handle grip means for using said tool, said main body having a front and a rear flat surface, a striker block fixedly secured to said rear flat surface of said main body for freeing a seized locking collar of a slack adjuster attached to the piston rod of a brake air cylinder, an opening provided through an upper end of said main body and removably receives a wrench socket which is received on the head of an adjustment screw in the body of said slack adjuster; said socket projecting from said front flat surface of said main body, a longitudinal axis of said striker block aligns with a longitudinal axis of both the opening and said socket, for applying a direct force to said socket received on said adjustment screw and said locking collar, the force being applied to a free end of said striker block by hammer means that frees a usually seized said locking collar in the body of said slack adjuster pivotally attached to said piston rod of said brake air cylinder; said longitudinal axis of the opening, said socket, and said striker block lying in a plane perpendicular to the plane of the main body, and a channel grip member is fixedly secured to the bottom end of said main body, at a center near outside surface of said channel, for engagement with the body of said slack adjuster such that when said main body is pulled by a user at said upper end, said slack adjuster pivots and moves said piston rod, enabling said user to check the stroke of said piston rod.

* * * * *